US008645673B2

(12) United States Patent
Bell, Jr. et al.

(10) Patent No.: US 8,645,673 B2
(45) Date of Patent: Feb. 4, 2014

(54) MULTICORE PROCESSOR AND METHOD OF USE THAT ADAPTS CORE FUNCTIONS BASED ON WORKLOAD EXECUTION

(75) Inventors: Robert H. Bell, Jr., Austin, TX (US); Louis Bennie Capps, Jr., Georgetown, TX (US); Thomas Edward Cook, Essex Junction, VT (US); Glenn G. Daves, Fishkill, NY (US); Ronald Edward Newhart, Essex Junction, VT (US); Michael A. Paolini, Austin, TX (US); Michael Jay Shapiro, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 8 days.

(21) Appl. No.: 13/613,936

(22) Filed: Sep. 13, 2012

(65) Prior Publication Data
US 2013/0013903 A1      Jan. 10, 2013

Related U.S. Application Data

(62) Division of application No. 12/197,357, filed on Aug. 25, 2008, now Pat. No. 8,327,126.

(51) Int. Cl.
*G06F 9/00* (2006.01)
*G06F 9/06* (2006.01)
*G06F 9/24* (2006.01)

(52) U.S. Cl.
USPC ........... 713/1; 713/2; 713/100; 712/1; 712/15

(58) Field of Classification Search
USPC ................... 713/1, 2, 100; 712/1, 15
See application file for complete search history.

(56) References Cited

U.S. PATENT DOCUMENTS

| 6,408,428 | B1 * | 6/2002 | Schlansker et al. ........... 716/104 |
| 6,751,783 | B1 * | 6/2004 | Eneboe et al. ................. 716/122 |
| 7,161,383 | B2 | 1/2007 | Siemers |
| 7,724,033 | B1 * | 5/2010 | Zen ............................... 326/41 |
| 7,725,682 | B2 | 5/2010 | Gschwind et al. |
| 7,734,895 | B1 | 6/2010 | Agarwal et al. |
| 7,788,670 | B2 | 8/2010 | Bodas et al. |
| 7,809,926 | B2 | 10/2010 | Martinez et al. |
| 2006/0075192 | A1 | 4/2006 | Golden et al. |
| 2007/0143577 | A1 | 6/2007 | Smith |
| 2007/0283349 | A1 * | 12/2007 | Creamer et al. ............. 718/100 |
| 2008/0010361 | A1 * | 1/2008 | Jacobs et al. ................. 709/218 |
| 2008/0263323 | A1 | 10/2008 | Mould et al. |
| 2009/0113169 | A1 | 4/2009 | Yang et al. |
| 2009/0228684 | A1 | 9/2009 | Ramesh et al. |
| 2009/0288092 | A1 | 11/2009 | Yamaoka |

* cited by examiner

*Primary Examiner* — Fahmida Rahman
(74) *Attorney, Agent, or Firm* — Terrile, Cannatti, Chambers & Holland, LLP; Robert W. Holland

(57) ABSTRACT

A processor has multiple cores with each core having an associated function to support processor operations. The functions performed by the cores are selectively altered to improve processor operations by balancing the resources applied for each function. For example, each core comprises a field programmable array that is selectively and dynamically programmed to perform a function, such as a floating point function or a fixed point function, based on the number of operations that use each function. As another example, a processor is built with a greater number of cores than can be simultaneously powered, each core associated with a function, so that cores having functions with lower utilization are selectively powered down.

14 Claims, 7 Drawing Sheets

MULTICORE PROCESSOR AND METHOD OF USE THAT ADAPTS CORE FUNCTIONS BASED ON WORKLOAD EXECUTION

CROSS-REFERENCE TO RELATED APPLICATIONS

This application is a divisional of application Ser. No. 12/197,357, filed Aug. 25, 2008, now U.S. Pat. No. 8,327, 126, entitled "Multicore Processor And Method Of Use That Adapts Core Functions Based On Workload Execution", and which is hereby incorporated by reference in its entirety.

BACKGROUND OF THE INVENTION

1. Field of the Invention

The present invention relates to processing information and more particularly to a multicore processor and method of use that adapts core functions based on workload execution.

2. Description of the Related Art

Microprocessors for general-purpose workloads, such as those found in servers and in workstations, are designed to balance workload expected at the server or workstation. This often means that trade-offs are made for performing workloads that are floating point intensive or integer intensive by designing in more circuits that are specialized for performing expected operations. Caches are designed to hold critical sections of the workload known as working sets, without increasing the thermal and cost parameters for the processor. Processors designed to perform generalized operations work well for a variety of workloads but are not optimal for any one specific task.

Task-specific processors, such as a digital signal processor device (DSPs), can exceed by many times the performance of general-purpose processors when executing their specialized workloads. However, when a DSP tuned for a specific workload encounters any other workload with even slightly varied characteristics, the DSP tends to run poorly.

Today's general purpose processors are often designed around benchmarks purported to represent the most likely workloads for designed operations. However, if a general-purpose processor is placed in an operational environment that tends to perform more of one operation than another, the operational efficiency will suffer. Similarly, if a specialized processor is placed in an operational environment that differs from its specialized environment, operational efficiency will suffer. The current state for processor design does not allow processors to adapt to workloads dynamically by reconfiguring themselves to match the characteristics of the currently executing software.

SUMMARY OF THE INVENTION

In accordance with the present invention, functions performed by a processor are dynamically adapted to an operational environment by re-configuring the processor so that functions performed by the processor more closely match the characteristics of the operational environment, such as the functions called by executing software on the processor.

This invention describes a method and apparatus for automatically, dynamically, and repeatedly reconfiguring a processor for optimal performance based on characteristics of currently executing software. The processor is designed to allow actual hardware function reconfiguration, such as by reprogramming a field programmable array associated with a unit of hardware or selectively powering predetermined hardware units. During run time, functional units are monitored to detect operations performed by workload execution. Less utilized functional units are re-configured so that new functional units are available to perform overutilized tasks. In essence, the processor "learns" the best configuration model for workloads by executing the workload and strengthening itself where the workload is stressing the processor through an internal restructuring of the processor.

BRIEF DESCRIPTION OF THE DRAWINGS

The present invention may be better understood, and its numerous objects, features, and advantages made apparent to those skilled in the art by referencing the accompanying drawings. The use of the same reference number throughout the several figures designates a like or similar element.

DETAILED DESCRIPTION

Figure 1:
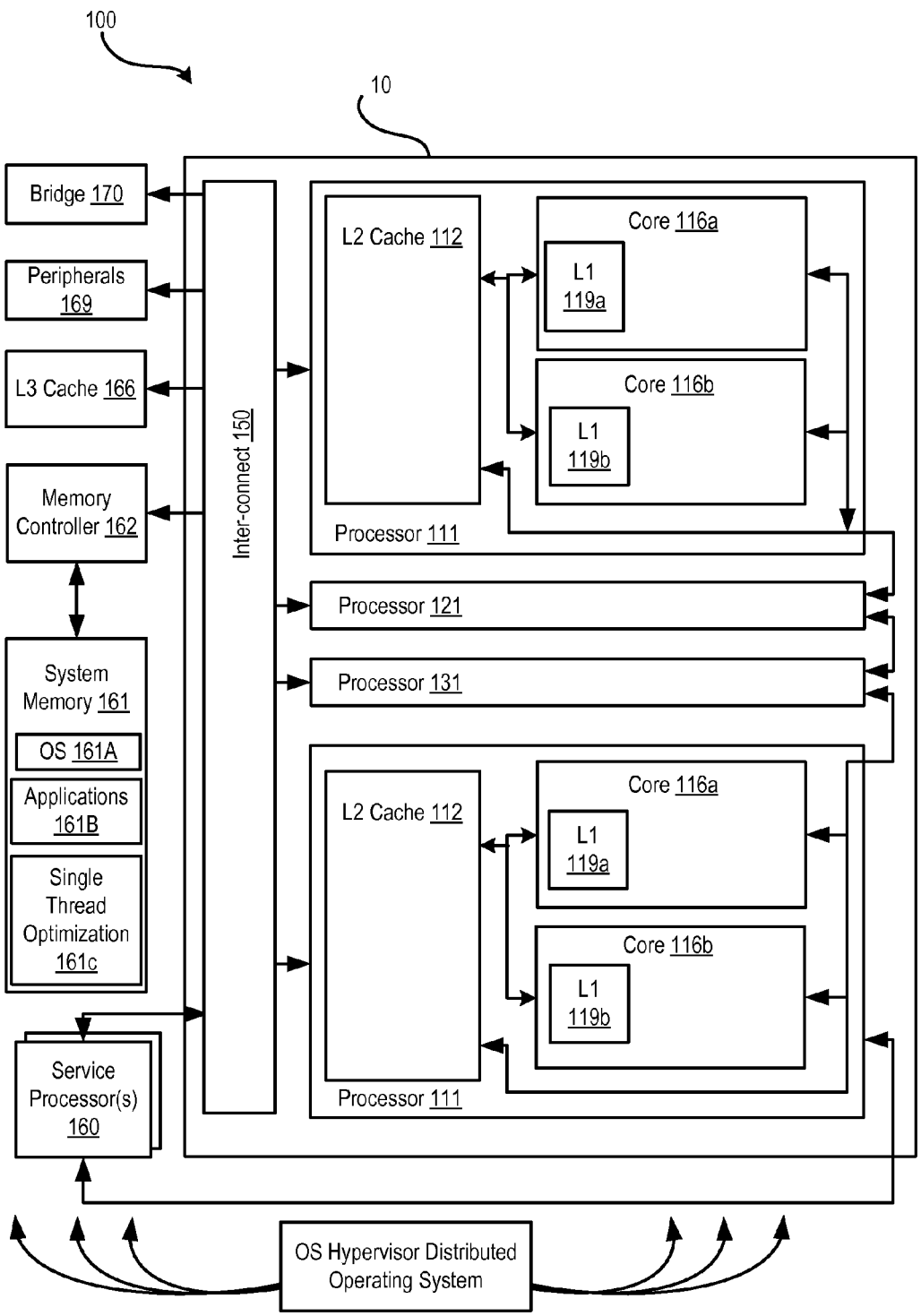
FIG. 1 shows a multi-processor computer architecture in which selected embodiments of the present invention may be implemented.

Referring now to FIG. 1, there is illustrated a high-level block diagram of a multiprocessor (MP) data processing system 100 that provides improved execution of single thread programs in accordance with selected embodiments of the present invention. The data processing system 100 has one or more processing units arranged in one or more processor groups, and as depicted, includes four processing units 111, 121, 131, 111 in processor group 10. In a symmetric multiprocessor (SMP) embodiment, all of the processing units 111, 121, 131, 111 are generally identical, that is, they all use a common set or subset of instructions and protocols to operate, and generally have the same architecture. As shown with processing unit 111, each processing unit may include one or more processor cores 116*a*, 116*b* which carry out program instructions in order to operate the computer. An exemplary processing unit would be the POWER5™ processor marketed by International Business Machines Corporation that comprises a single integrated circuit superscalar microprocessor having various execution units, registers, buffers, memories, and other functional units, which are all formed by integrated circuitry. The processor cores may operate according to reduced instruction set computing (RISC) techniques, and may employ both pipelining and out-of-order execution of instructions to further improve the performance of the superscalar architecture.

As further depicted in FIG. 1, each processor core 116*a*, 116*b* includes an on-board (L1) cache memory 119*a*, 119*b* (typically, separate instruction and data caches) that is constructed from high-speed memory devices. Caches are commonly used to temporarily store values that might be repeatedly accessed by a processor, in order to speed up processing by avoiding the longer step of loading the values from system memory 161. A processing unit can include another cache such as a second level (L2) cache 112 which, along with a cache memory controller (not shown), supports both of the L1 caches 119a, 119b that are respectively part of cores 116a and 116b. Additional cache levels may be provided, such as an L3 cache 166 which is accessible via fabric bus 150. Each cache level, from highest (L1) to lowest (L3) can successively store more information, but at a longer access penalty. For example, the on-board L1 caches (e.g., 119a) in the processor cores (e.g., 116a) might have a storage capacity of 128 kilobytes of memory, L2 cache 112 might have a storage capacity of 4 megabytes, and L3 cache 166 might have a storage capacity of 132 megabytes. To facilitate repair/replacement of defective processing unit components, each processing unit 111, 121, 131, 111 may be constructed in the form of a replaceable circuit board, pluggable module, or similar field replaceable unit (FRU), which can be easily swapped, installed in, or swapped out of system 100 in a modular fashion.

The processing units communicate with other components of system 100 via a system interconnect or fabric bus 150. Fabric bus 150 is connected to one or more service processors 160, a system memory device 161, a memory controller 162, a shared or L3 system cache 166, and/or various peripheral devices 169. A processor bridge 170 can optionally be used to interconnect additional processor groups. Though not shown, it will be understood that the data processing system 100 may also include firmware which stores the system's basic input/output logic, and seeks out and loads an operating system from one of the peripherals whenever the computer system is first turned on (booted).

As depicted in FIG. 1, the data processing system 100 includes multiple system resources (e.g., cache memories, memory controllers, interconnects, I/O controllers, etc) which are shared among multiple threads.

The system memory device 161 (random access memory or RAM) stores program instructions and operand data used by the processing units, in a volatile (temporary) state, including the operating system 161A and application programs 161B. Single thread optimization module 161C may be stored in the system memory in any desired form, such as an operating system module, Hypervisor component, etc, and is used to optimize the execution of a single threaded program across multiple cores of the processor units. Although illustrated, as a facility within system memory, those skilled in the art will appreciate that single thread optimization module 161C may alternatively be implemented within another component of data processing system 100. The single thread optimization module 161C is implemented as executable instructions, code and/or control logic including programmable registers which is operative to check performance monitor information for codes running on the system 100, to assign priority values to the code using predetermined policies, and to tag each instruction with its assigned priority value so that the priority value is distributed across the system 100 with the instruction, as described more fully below.

Figure 2:
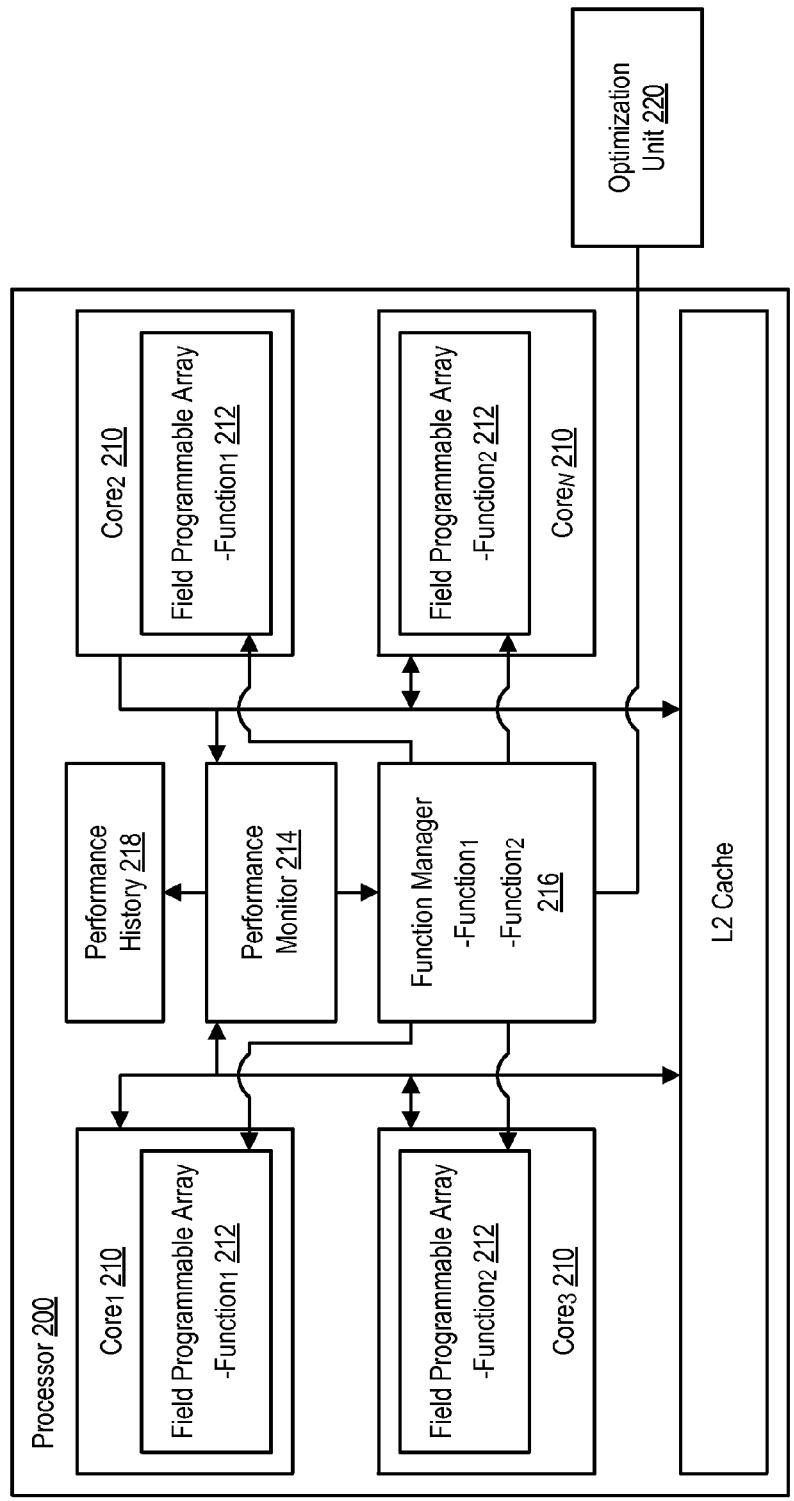
FIG. 2 shows a block diagram of a processor architecture in which selected embodiments of the present invention may be implemented.

Referring now to FIG. 2, a block diagram shows a processor architecture in which selected embodiments of the present invention may be implemented. A processor 200 has plural core units 210 that are managed by field programmable arrays 212. Field programmable arrays 212 are similar to field programmable gate array (FPGA) devices that are incorporated within the silicon of the integrated circuit. The field programmable arrays are initially programmed with a set of execution units similar to the execution units that perform general-purpose fixed functions in conventional processors, however, field programmable arrays 212 are re-programmable so that the function performed by a core 210 can be dynamically updated. Dynamically reconfigurable processor 200 begins executing a software workload with each core having an initial function defined by programming within field programmable array 212. As the workload operations progress, a performance monitor 214 monitors operations to determine if a functional core unit 210 within the processor 200 has more activity than other functional core units 210. If the processor 200 has a particular functional core unit 210 having greater activity than other cores 210, throughput and/or response time of processor 200 can be improved for the current workload by dynamically reprogramming other cores to perform the function of the core 210 having the greater activity. A function manager 216 integrated in processor 200 and interfaced with performance monitor 214 dynamically configures additional function core units 210 having field programmable arrays to perform the function of the most active core 210 so that the reprogrammed core 210 performs the function in an efficient manner. The logic to issue non-dependent instructions to the re-configured units and complete instructions from the units exist in function manager 216 or in integrated memory accessible by function manager 216. Re-programmed functional core units 210 are brought online inside the processor 200 to begin executing the software workload. With more core units 210 of the processor matching the workload demand, throughput and response time of processor operations is improved.

As an example, a processor 200 that starts out with two floating-point core units 210 and two integer core units 210 defined in re-configurable field programmable arrays 212. If processor 200 begins executing a numerically intensive scientific application, performance monitor 214 detects that the floating-point core units 210 are relatively full of instructions on every processor cycle, while the integer core units 210 are relatively unused or even idle. Function manager 216 detects unbalance operations provided by performance monitor 214 and recognizes that the floating-point core units 210 are relatively busy performing operations while the integer core units 210 are relatively idle. Function manager 216 erases the programming of one of the idle integer core unit 210's field programmable array 212 and reprograms the erased field programmable array 212 to have a floating-point functionality instead of integer functionality. The re-configured floating point core unit 210 interfaces into the set of floating-point core units 210 essentially creating a new processor with 3 floating point core units 210 and 1 integer core unit 210. Numerical applications will execute much faster with the dynamically added floating-point core unit 210.

As a further example, once the numerically intensive application completes operations on processor 200, performance monitor 214, and function manager 216 monitor operations to selectively alter functions of cores 210 if needed. For example, if an application having greater use of integer functions, such as a Web application, is dispatched on the processor, a re-configuration of cores 210 adjusts operations of processor 200 to more optimally manage integer operations rather than floating-point operations. With initiation of a Web application that is generally dominated by integer operations, function manager 216 detects the increase in integer operations through performance monitor 214 to recognize that the integer core units 210 have a relatively high utilization and the floating-point core units 210 remain relatively under utilized or idle. In response, function manager 214 removes one or more of the floating-point core units 210 and reprograms the field programmable arrays of those units with integer logic to provide cores having integer functionality. In alternative embodiments, other functions might be used by programming field programmable arrays 212 with logic to perform desired functions, such as additional cache cores 210 to improve the throughput of the integer intensive application.

Dynamic reconfiguration of processor core functions based on workload characteristics expands the capability of a "general purpose" processor can accomplish by allowing continual adaptation of the processor to operations run on the processor. Rather than relying on a static processor design that attempts to balance demands created by expected operations, the processor automatically, dynamically, and repeatedly reconfigures itself based on workload characteristics to provide performance gains. A performance history 218 tracks and stores re-configurations for analysis that supports further improvements in processor operations. An optimization unit 220 allows initial programming of field programmable arrays 212 so that processor 200 is pre-configured for expected operations of an upcoming workload. For example, just-in-time compilation or runtime optimization predicts how operations will demand programmable functions and pre-programs the functions in the cores 210 so that processor 200 will run the workload with a balanced use of available resources.

Figure 3:
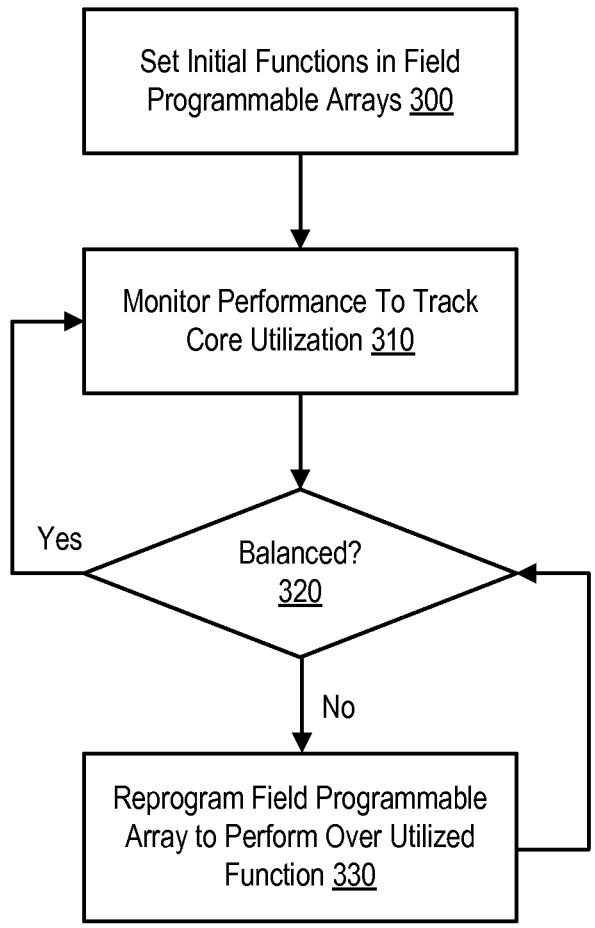
FIG. 3 shows a flow diagram of a process for dynamically altering processor core functions in one embodiment of the present invention.

Referring now to FIG. 3, a flow diagram shows a process for dynamically altering processor core functions in one embodiment of the present invention. At step 300, initial functions are set in core field programmable arrays of the processor to provide the processor with initial processing characteristics. The initial settings might take a balanced approach, much like that taken to design general-purpose processors, or the initial settings might bias the balance of processing capabilities towards a particular function. For instance, at the initiation of a software workload, just-in-time compilation or runtime optimization help to predict a greater number of operations using a particular function so that a more balanced configuration of functions is provided by re-programming at least some of the field programmable arrays to provide an additional number of cores with functions that will be in higher demand. At step 310, the performance of the programmable core units is monitored to track the utilization of each core. At step 320, a determination is made of whether the workload is balanced across the cores. A balanced operation will have generally equal utilization of all cores over a given period, while an unbalanced operation will have over-utilization of cores with a common function and underutilization of cores with another common function. If the workload is balanced, the process returns to step 310. If the workload is unbalanced, the process continues to step 330 to reprogram at least one field programmable array from performing an underutilized function to perform the overutilized function. The process then returns to step 310 to continue with monitoring of the performance of the programmable units.

Figure 4:
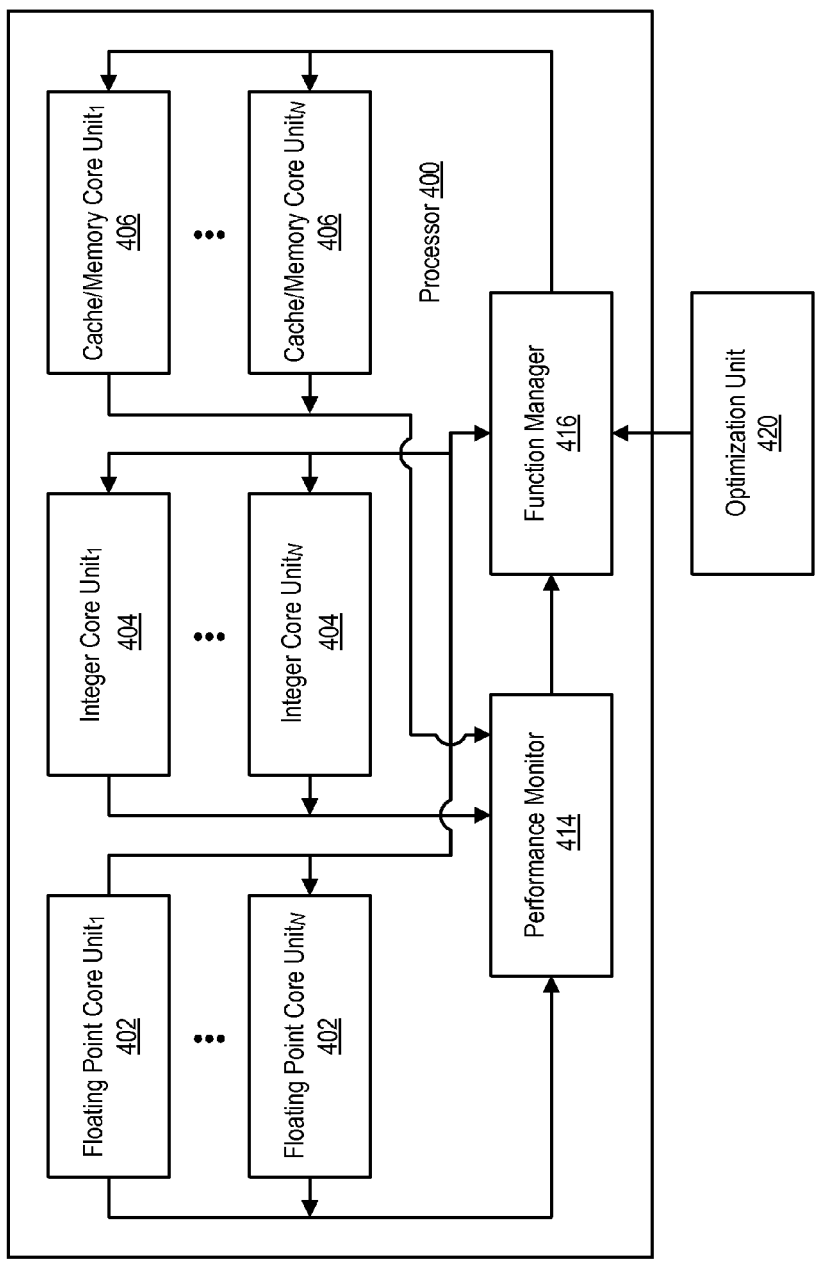
FIG. 4 shows a block diagram of a processor architecture in which selected embodiments of the present invention may be implemented.

Referring now to FIG. 4, a block diagram shows a processor architecture in which selected embodiments of the present invention may be implemented. In the example embodiment shown in FIG. 2, field programmable arrays illustrate a technique for processor 200 to be reconfigured dynamically. In the example embodiment shown by FIG. 4, another technique is applied to reconfigure a processor 400 dynamically but without the use of field programmable arrays. Processor 400 is populated with an overabundance of floating-point core units 402, integer core units 404, and cache/memory core units 406. Applying electricity to all execution units of processor 400 would overwhelm the power limits of the processor 400. Instead, a function manager on processor 400 selectively energizes a subset mix of core units based on workload needs to automatically, dynamically, and repeatedly reconfigure processor 400. A performance monitor 414 tracks the utilization of the core units that receive power so that function manager 416 can adjust the core units that receive power as workload operations shift from reliance on a particular function to another function. For example, if a scientific application runs on processor 400, function manager 416 powers up extra floating-point core units 402 while powering down integer core units 404. Similarly, if a web application replaces the scientific application, function manager 416 powers up integer core units 404 and cache memory core units 406 while powering down floating point core units 402.

Figure 5:
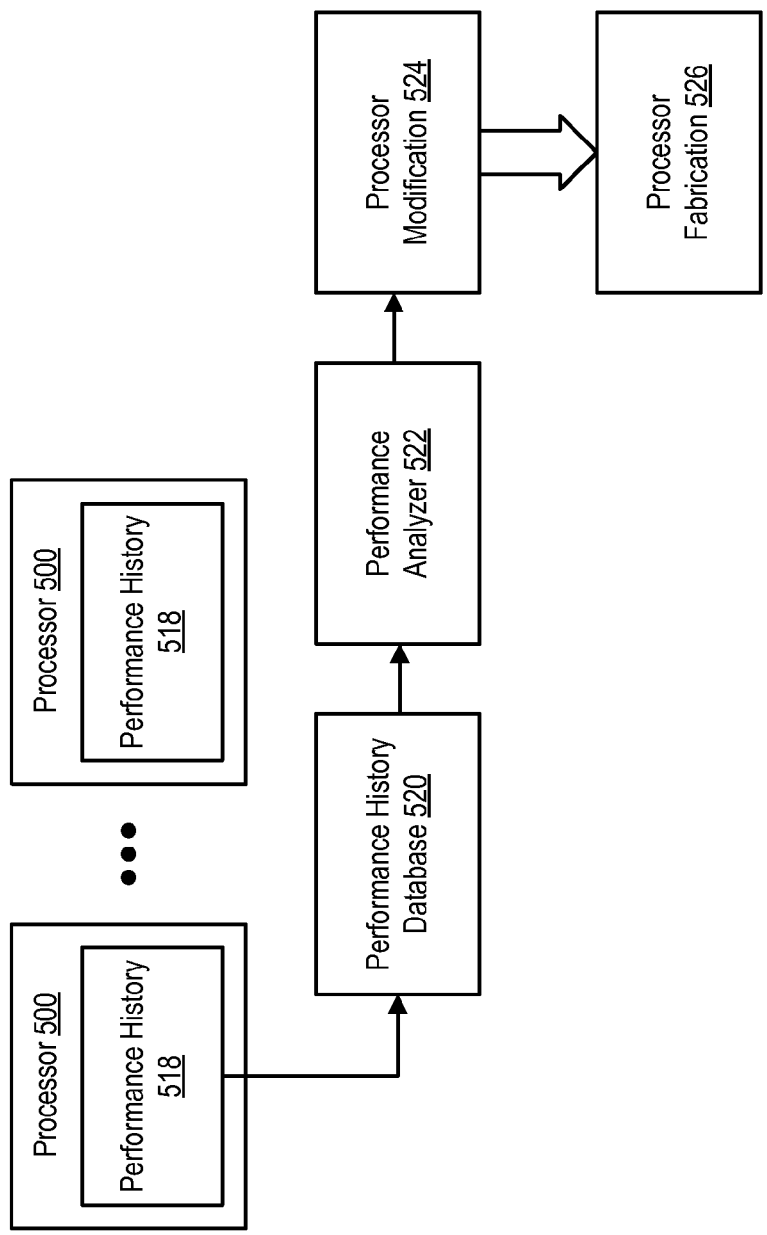
FIG. 5 shows a block diagram of a process for development of a processor according to the present invention.
Figure 6A:
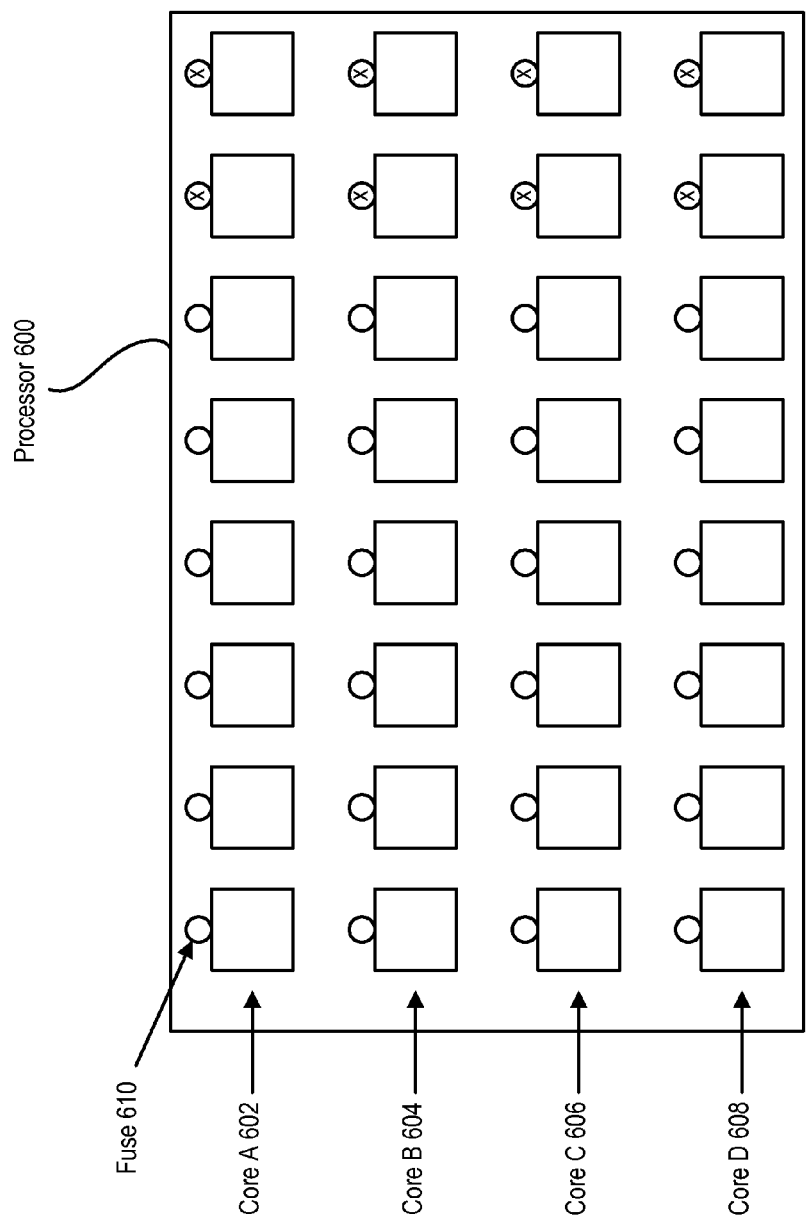
FIGS. 6A and 6B show block diagrams of a processor architecture developed by analysis of core functions.

Both the field programmable array solution and the selective power solution, dynamically create fixed point and floating point capabilities in response to utilization, however, other types of functions may also be managed, such as selectively programming a core to be a scalar FP or a vector (VMX) unit. Compiler techniques, such as just-in-time compilation and runtime optimization, allow optimization of processor operations based upon a predicted reliance of a workload on a particular function as the workload executes. For example, optimization unit 420 directs function manager 416 to set an initial number of core units by function type based on the operations predicted to run during compilation or optimization. For example, a just-in-time compiler recognizes a basic block of a software program which executes repeatedly and caches an optimized version of that code. Application of this technology to a processor of the present invention helps to recognize basic blocks which are then programmed into the field programmable arrays of the processor, effectively turning the core having the field programmable arrays into acceleration units. Over time, a processor that started out looking like a general-purpose processor takes on entirely different characteristics as the computer's hardware and software work together to build a new processor based on workloads executing throughout time. Such acceleration units created entirely by the computer can later be harvested and used to help design future processors. For example, field data harvested from a processor indicates the frequency of usage for programmable functions, such as the number floating point, vector (VMX) or integer threads managed by a core unit. The field harvested data is applied for manufacture of self-reconfiguring processors to preload functions with a more optimized configuration for targeted customers or industries before the processors leave the fabrication plant. Similarly, statically-configurable processors, such as those discussed below with respect to FIGS. 5 and 6, are configured to offer optimized operations for a selected customer or industry based on monitoring of functions used by processors at the customer or industry, such as in dynamically-configurable processors. Thus, for instance, a plurality of processors are distributed to field locations associated with a customer or industry for use by the customer or industry. The use of floating point, VMX and integer functions by the processors is monitored and then provided to the processor fabrication location for analysis. Based on the usage of floating point, VMX and integer functions in the field, a processor configuration is determined having a mixture of integer and floating point functions adjusted for the gathered field data. The processor configuration is used to fabricate processors for the customer or industry having a more optimal mixture of integer and floating point cores.

Figure 6B:
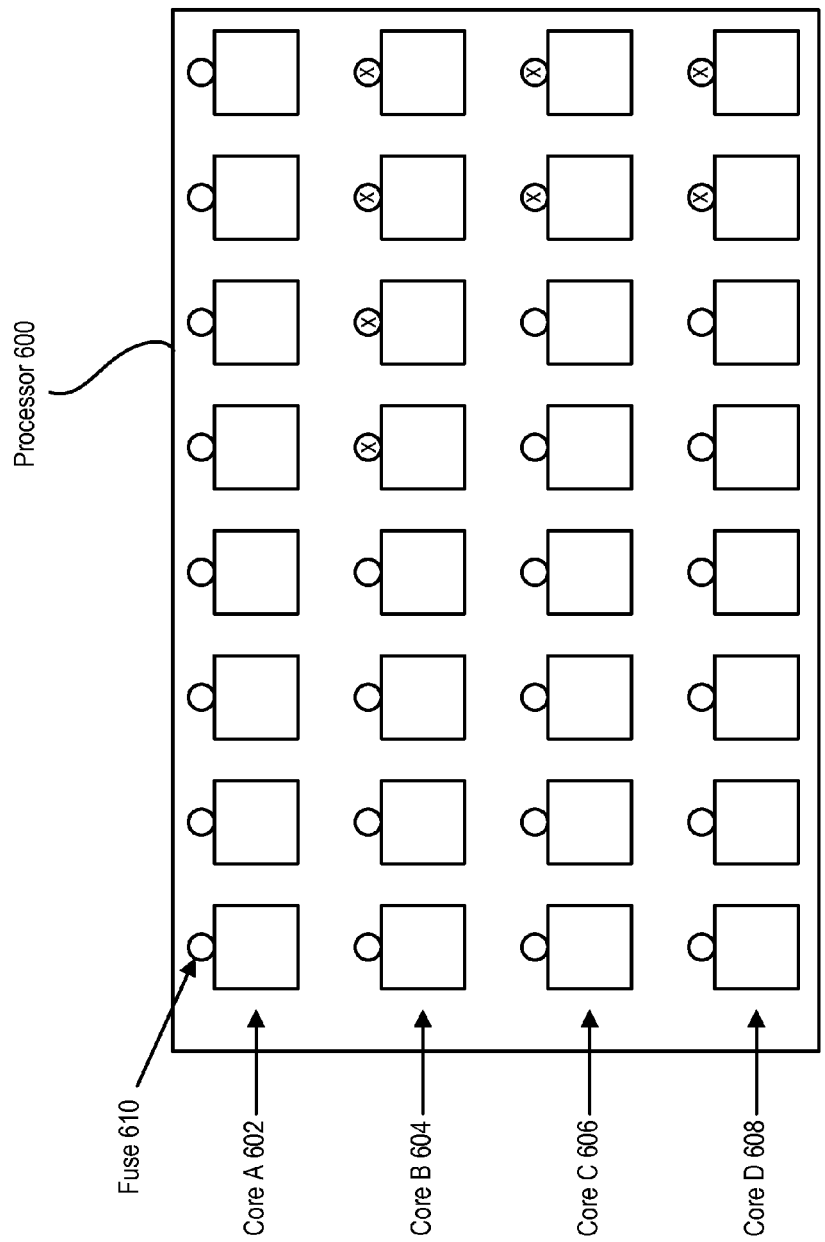

Referring now to FIG. 5, a block diagram shows a process for development of a processor according to the present invention. Processors 500 have functions that are selectively programmed based on utilization of the functions, such as is set forth with FIGS. 2 and 4. The selective programming of functions is examined over time to determine performance and usage data across a plurality of such processors 500. Each processor 500 includes a performance history 518 that is periodically downloaded to a performance history database 520. A performance analyzer 522 examines workload types and multicore utilization based on the histories in performance history database 520 along with other available information, such as identification of the types of applications run on the processors 500. Performance analyzer 522 analyzes the history in performance history database 520 to generate processor modifications 524 based on the multicore units that are underutilized. Based on this information, future chip design and at processor fabrication 526 can be modified for better optimization by including additional resources to address overutilization in the place of resources having underutilization. In the case of field programmable arrays, cores can be removed and/or added to improve the processor operations quickly. In the case of a hardened multicore chip, fuses can be blown to enable and disable cores to bias the processor towards a greater balance of capability with overutilized functions. For example, referring to FIG. 6A, a processor 600 is initially designed with four types of cores: core A 602, core B 604, core C 606, and core D 608. Each type of core A-D has two fuses 610 that are blown so that, in total, each core type has six cores that receive power. Performance monitoring of the processor 600 depicted in FIG. 5 indicates an overutilization of the core A 602 and underutilization of the core B 604. As a result, as is depicted by FIG. 6B, a new processor is created quickly without a substantial redesign that will have a positive impact on performance. In the new processor, all of the core A 602 cores receive power with no fuses 610 blown while only four core B 604 cores receive power due to four fuses 610 that are blown for the core Bs 604.

Consequently, the invention is intended to be limited only by the spirit and scope of the appended claims, giving full cognizance to equivalents in all respects.

What is claimed is:

1. A method for manufacture of a processor, the method comprising:
   distributing one or more processors to one or more field locations, the one or more processors having programmable functions determined by instructions stored in programmable arrays;
   monitoring the processors, by a performance monitor integrated in the respective processor, at the field locations to determine the use of plural functions;
   analyzing the use of plural functions to determine a processor configuration adapted to the use of plural functions;
   manufacturing processors with the determined processor configuration by storing instructions in the programmable arrays to provide the determined processor configuration; and
   shipping the manufactured processors for use at the field location;
   wherein analyzing the use of plural functions further comprises analyzing use of floating point functions and integer functions to determine a processor configuration having a mixture of floating point core units and integer core units adjusted according to the analyzed use.

2. The method of claim 1 wherein monitoring the processors further comprises monitoring the use of vector processing functions (VMX) performed at the processors.

3. The method of claim 1 wherein the distributing one or more processors further comprises distributing the one or more processors with an initial configuration of programmable core units, each core unit initial configuration operable to perform an initial function.

4. The method of claim 3 wherein monitoring the processors at the one or more field locations further comprises monitoring re-programming of the programmable core units from the initial configuration to one or more secondary configurations, each secondary configuration operable to perform a secondary function.

5. The method of claim 4 wherein analyzing the use of plural functions further comprises analyzing the re-programming of the programmable core units over time to determine an optimized configuration of programmable core units adapted to the field location.

6. The method of claim 1 wherein distributing one or more processors further comprises distributing the one or more processors with a configuration of selectively powered cores, each core having one function, the function activated if power is selectively applied to the core.

7. The method of claim 6 wherein monitoring the processors further comprises monitoring the selectively power cores to track activation of cores by selectively applying power to the cores.

8. The method of claim 7 wherein selectively applying power to the cores selectively adjusts the ratio of floating point and integer cores at a processor.

9. The method of claim 8 wherein analyzing the use of the plural functions further comprises analyzing the applying power to the cores.

10. A method for manufacture of a processor, the method comprising:
    processing information with a processor at a field location, the processor having plural cores, each of the plural cores having one function and re-programmable to at least a second function;
    re-programming at least some of the plural cores in response to plural workloads performed by the processor at the field location;
    storing at the processor a history of the re-programming;
    analyzing the history of the re-programming to determine a frequency of use of the functions at the plural cores;
    determining an initial processor configuration adapted to the field location based on the determined frequency of use; and
    manufacturing processors with the determined processor configuration by programming the plural cores to have the determined processor configuration.

11. The method of claim 10 wherein re-programming at least some of the plural cores further comprises programming at least some of the plural cores to perform a floating point function instead of an integer function.

12. The method of claim 10 wherein re-programming at least some of the plural cores further comprise programming at least some of the plural cores to perform an integer function instead of a floating point function.

13. The method of claim 10 wherein re-programming at least some of the plural cores further comprises programming at least some of the plural cores to perform a vector processing function instead of an integer function.

14. The method of claim 10 wherein re-programming at least some of the plural cores further comprises programming at least some of the plural cores to perform a floating point function instead of a vector processing function.

* * * * *